United States Patent
Kim et al.

(10) Patent No.: US 9,279,976 B2
(45) Date of Patent: Mar. 8, 2016

(54) ELECTROWETTING DISPLAY APPARATUS AND METHOD OF MANUFACTURING THE SAME

(71) Applicant: Liquavista B.V., Eindhoven (NL)

(72) Inventors: Dong-Hwan Kim, Asan-si (KR);
Sang-Il Kim, Yongin-si (KR);
Tae-Woon Cha, Seoul (KR);
Myung-Hwan Kim, Yongin-si (KR);
Woo Yong Sung, Seoul (KR); Jeongho Lee, Seoul (KR); Hyoung-Wook Lee, Seoul (KR); Hyeon Gu Cho, Yongin-si (KR)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/507,423

(22) Filed: Oct. 6, 2014

(65) Prior Publication Data
US 2015/0022875 A1  Jan. 22, 2015

Related U.S. Application Data

(62) Division of application No. 13/743,759, filed on Jan. 17, 2013, now Pat. No. 8,854,717.

(30) Foreign Application Priority Data

Jan. 18, 2012  (KR) .................. 10-2012-0005756

(51) Int. Cl.
*G02B 26/00* (2006.01)
*G02B 1/06* (2006.01)
*G02B 1/10* (2015.01)
*G02B 1/12* (2006.01)

(52) U.S. Cl.
CPC .............. *G02B 26/005* (2013.01); *G02B 1/06* (2013.01); *G02B 1/10* (2013.01); *G02B 1/12* (2013.01)

(58) Field of Classification Search
CPC .......... G02B 26/005; G02B 1/06; G02B 1/12; G02B 1/10
See application file for complete search history.

(56) References Cited

U.S. PATENT DOCUMENTS

| | | | |
|---|---|---|---|
| 7,746,540 B2 | 6/2010 | Lo et al. | |
| 7,821,699 B1 | 10/2010 | Lo et al. | |
| 8,599,465 B2 | 12/2013 | Hsieh | |
| 8,654,428 B2 | 2/2014 | Tian | |
| 8,854,717 B2 * | 10/2014 | Kim | ...................... G02B 26/005 359/290 |
| 2010/0223779 A1 | 9/2010 | Lo et al. | |
| 2011/0127507 A1 | 6/2011 | Choi et al. | |

(Continued)

FOREIGN PATENT DOCUMENTS

| KR | 100782466 B1 | 11/2007 |
|---|---|---|
| KR | 1020080002201 A | 1/2008 |

(Continued)

*Primary Examiner* — David N Spector
(74) *Attorney, Agent, or Firm* — Lee & Hayes, PLLC (57) ABSTRACT

An electrowetting display apparatus includes a first base substrate, a second base substrate which faces the first base substrate, a first electrode on the first base substrate, and a second electrode on the second base substrate, where the second electrode faces the first electrode. A barrier wall is on the first electrode, where the barrier wall defines a storage area. A surface of the first electrode and the barrier wall is overlapped by a barrier layer. In addition, a water-repellent layer is on the barrier layer which is in the storage area. First and second fluids are in the storage area, the first fluid is separate from the second fluid, and the first fluid or the second fluid has a polarity.

21 Claims, 10 Drawing Sheets

(56) References Cited

U.S. PATENT DOCUMENTS

2013/0329274 A1 12/2013 Yang et al.
2013/0335804 A1 12/2013 Sung et al.

FOREIGN PATENT DOCUMENTS

| KR | 1020090071111 A | 7/2009 |
|----|-----------------|--------|
| KR | 101055697 B1 | 2/2011 |

* cited by examiner

ELECTROWETTING DISPLAY APPARATUS AND METHOD OF MANUFACTURING THE SAME

This application is a divisional of and claims priority to U.S. patent application Ser. No. 13/743,759, filed Jan. 17, 2013, now U.S. Pat. No. 8,854,717, issued Oct. 7, 2014, which claims priority to Korean Patent Application No. 10-2012-0005756, filed Jan. 18, 2012, and all the benefits accruing therefrom under 35 U.S.C. §119, the contents of which are herein incorporated by reference in its entirety.

BACKGROUND

1. Field

The invention relates to an electrowetting display apparatus and a method of manufacturing the same. More particularly, the invention relates to an electrowetting display apparatus having improved display characteristics and a method of manufacturing the electrowetting display apparatus.

2. Description of the Related Art

An electrowetting display apparatus displays images using an electrowetting phenomenon that causes the movement or deformation of fluid by applying a voltage to the fluid in order to change the surface tension of the fluid.

The electrowetting display apparatus does not employ a polarizing plate, and thus the electrowetting display apparatus has various properties, such as high transmittance and reflectance, low power consumption, fast response speed, etc. Accordingly, the electrowetting display apparatus has been heavily researched and developed as a next generation display apparatus.

SUMMARY

Exemplary embodiments of the invention provide an electrowetting display apparatus having a structure simplifying a manufacturing process thereof.

Exemplary embodiments of the invention provide a method of manufacturing the electrowetting display apparatus.

According to the exemplary embodiments, an electrowetting display apparatus includes a first base substrate, a second base substrate which faces the first base substrate, a first electrode on the first base substrate, a barrier wall on the first base substrate, the barrier wall defining a storage area, a barrier layer which overlaps a surface of the first electrode and of the barrier wall, a water-repellent layer on the barrier layer which is in the storage area, and first and second fluids in the storage area. The first and second fluids are not mixed with each other, and at least one of the first fluid or the second fluid has a polarity.

According to the exemplary embodiments, a method of manufacturing an electrowetting display apparatus includes forming a first electrode on a first base substrate, forming a barrier wall on the first base substrate, the barrier wall defining a storage area, forming a barrier layer which overlaps a surface of the first electrode and of the barrier wall, forming a water-repellent layer on the barrier layer which is in the storage area, forming a first fluid in the storage area and forming a second fluid in the storage area. The first fluid and the second fluid are not mixed with each other.

According to the exemplary embodiments, a method of manufacturing an electrowetting display apparatus includes forming a first electrode on a first base substrate, forming a barrier layer on the first base substrate, the barrier layer overlapping the first electrode, forming a barrier wall on the barrier layer, the barrier layer defining a storage area, forming a water-repellent layer on the formed barrier layer in the storage area using a transfer method, forming a second electrode on a second base substrate, the second electrode facing the first electrode, forming a first fluid in the storage area, and forming a second fluid in the storage area. The first fluid and the second fluid are not mixed with each other.

According to one or more exemplary embodiments described above, the barrier wall is formed before forming the barrier layer, and thus the surface of the barrier wall has the hydrophilic property due to the barrier layer which is on an outer surface of the barrier wall. Thus, no additional process is required to allow the surface of the barrier wall to have the hydrophilic property. As a result, a manufacturing process of the electrowetting display apparatus may be simplified.

In addition, since the water-repellent layer is formed through a transfer method, uniformity of the surface of the water-repellent layer may be improved, and the water-repellent layer may be transferred to a desired position without the existence of the barrier wall.

BRIEF DESCRIPTION OF THE DRAWINGS

The above and other advantages of the invention will become readily apparent by reference to the following detailed description when considered in conjunction with the accompanying drawings wherein.

DETAILED DESCRIPTION

It will be understood that when an element or layer is referred to as being "on," or "connected to" another element or layer, it can be directly on, connected or coupled to the other element or layer or intervening elements or layers may be present. In contrast, when an element is referred to as being "directly on" or "directly connected to" another element or layer, there are no intervening elements or layers present. Like numbers refer to like elements throughout. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the invention.

Spatially relative terms, such as "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "lower" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms, "a," "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

Hereinafter, the invention will be explained in detail with reference to the accompanying drawings.

Figure 1:
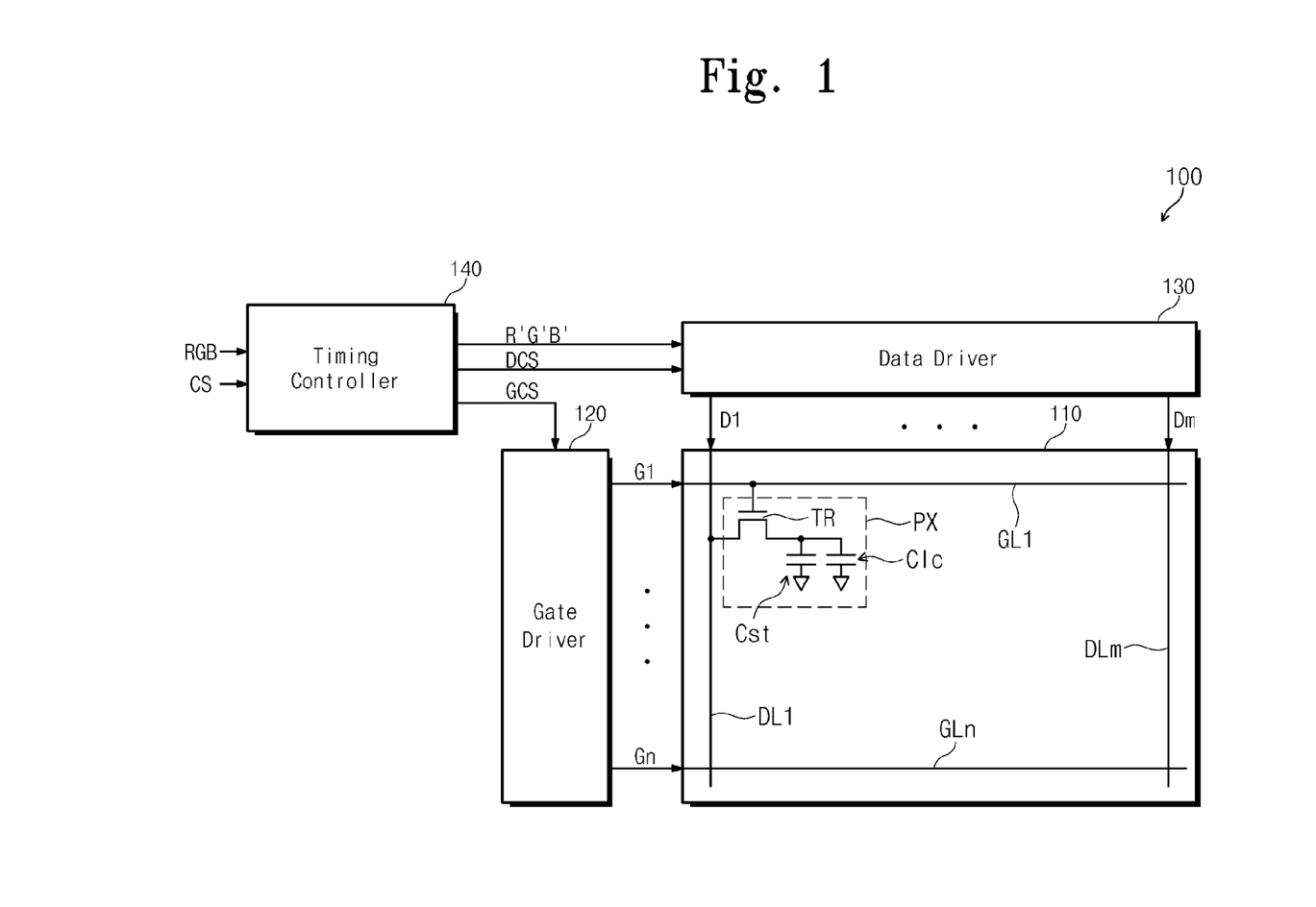
FIG. 1 is a block diagram showing an exemplary embodiment of an electrowetting display apparatus according to the invention.

FIG. 1 is a block diagram showing an exemplary embodiment of an electrowetting display apparatus according to the invention.

Referring to FIG. 1, an electrowetting display apparatus 100 includes a display panel 110, a gate driver 120, a data driver 130 and a timing controller 140. Hereinafter, for the convenience of explanation, the electrowetting display apparatus 100 will be referred to as a display apparatus.

The timing controller 140 receives image signals RGB and control signals CS from outside the display apparatus 100. The timing controller 140 converts a data format of the image signals RGB into a data format appropriate to an interface between the data driver 130 and the timing controller 140 and applies the converted image signals R'G'B' to the data driver 130. In addition, the timing controller 140 applies data control signals DCS, such as an output start signal, a horizontal start signal, a polarity inversion signal, etc., to the data driver 130.

The timing controller 140 applies gate control signals GCS, such as a vertical start signal, a vertical clock signal, a vertical clock bar signal, etc., to the gate driver 120.

The gate driver 120 sequentially outputs gate signals G1 to Gn in response to the gate control signals GCS from the timing controller 140.

The data driver 130 converts the image signals R'G'B' into data voltages D1 to Dm in response to the data control signals DCS from the timing controller 140. The data voltages D1 to Dm output from the data driver 130 are applied to the display panel 110.

The display panel 110 includes a plurality of gate lines GL1 to GLn, a plurality of data lines DL1 to DLm crossing the gate lines GL1 to GLn, and a plurality of pixels PX.

In the exemplary embodiment, the pixels PX have the same structure and function, and thus for the convenience of explanation, one pixel has been shown in detail in FIG. 1.

In one exemplary embodiment, each pixel PX includes a thin film transistor TR, a liquid crystal capacitor Clc and a storage capacitor Cst. The liquid crystal capacitor Clc includes a pixel electrode and a common electrode, and the storage capacitor Cst includes the pixel electrode and a storage electrode.

The thin film transistor TR includes a gate electrode connected to a corresponding one gate line of the gate lines GL1 to GLn, a corresponding one data line of the data lines DL1 to DLm, and a drain electrode connected to the pixel electrode.

The gate lines GL1 to GLn are connected to the gate driver 120 to receive the gate signals G1 to Gn. The data lines DL1 to DLm are connected to the data driver 130 to receive the data voltages D1 to Dm from the data driver 130.

The thin film transistor TR in each pixel PX is turned on in response to the gate signal provided through the corresponding gate line, and the data voltage provided to the corresponding data line is applied to the pixel electrode through the turned-on thin film transistor TR. In this case, the common electrode is applied with a common voltage.

Although not shown in FIG. 1, the display apparatus 100 may further include a backlight unit disposed adjacent to the display panel 110 to supply a light to the display panel 110. The backlight unit includes a plurality of light sources, e.g., a light emitting diode ("LED"), a cold cathode fluorescent lamp ("CCFL"), etc.

Figure 2:
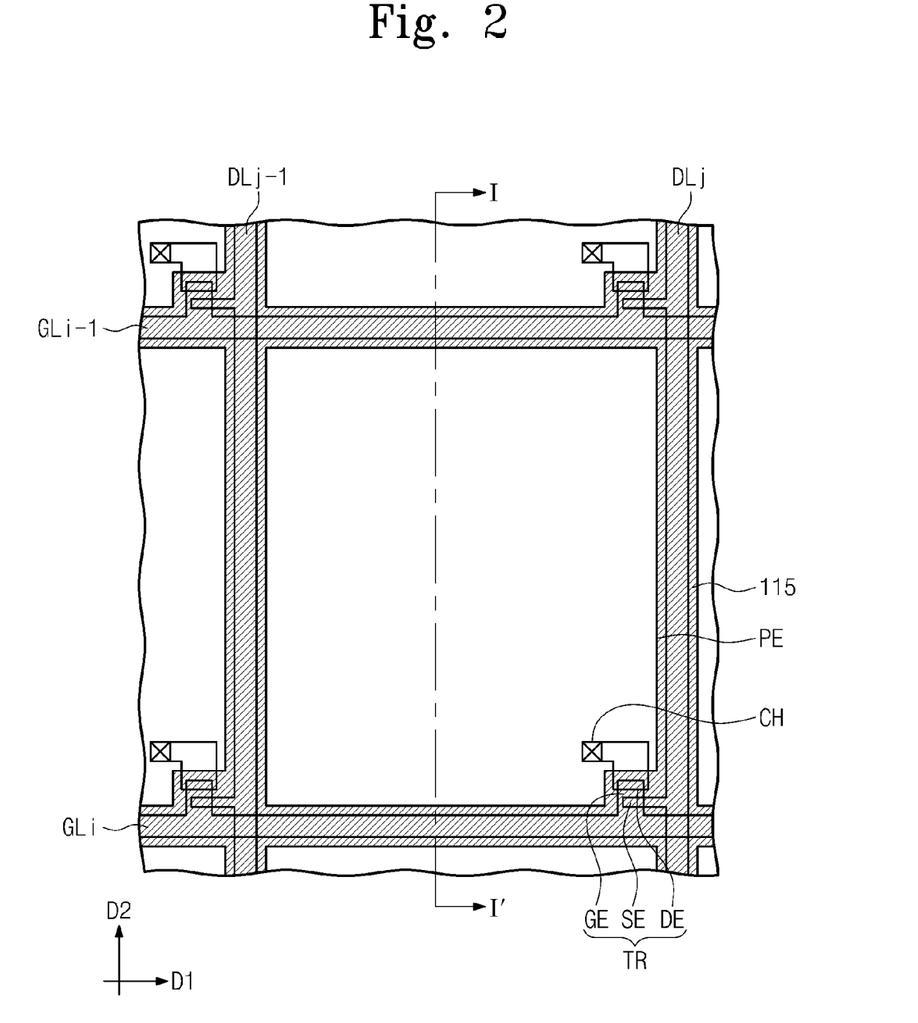
FIG. 2 is a plan view showing an exemplary embodiment of a pixel shown in FIG. 1.
Figure 3:
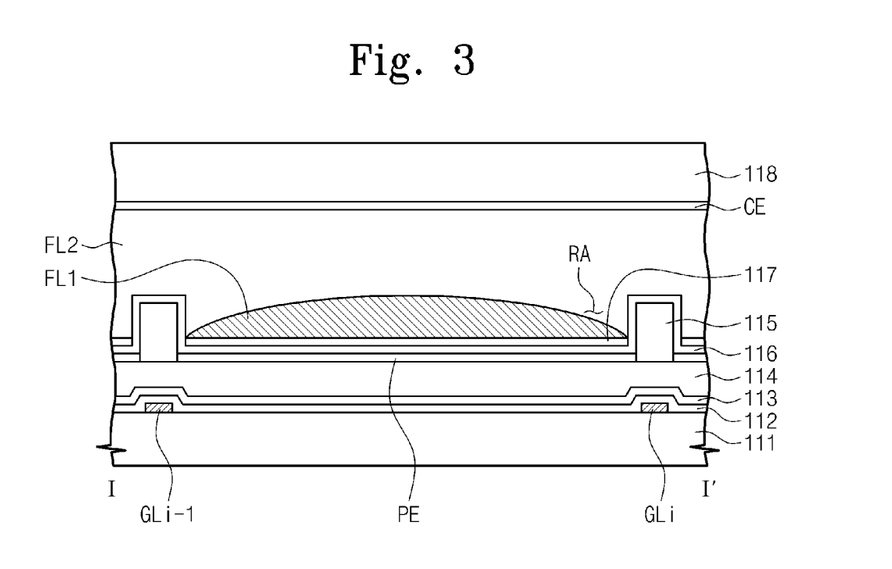
FIG. 3 is a cross-sectional view taken along line I-I' shown in FIG. 2.

FIG. 2 is a plan view showing an exemplary embodiment of a pixel shown in FIG. 1 and FIG. 3 is a cross-sectional view taken along line I-I' shown in FIG. 2. The pixels PX shown in FIG. 1 have the same structure and function, and thus for the convenience of explanation, an exemplary embodiment of only one pixel PX has been shown in FIG. 2.

Referring to FIGS. 2 and 3, the display panel 110 includes a first base substrate 111 and a second base substrate 118. The first and second base substrates 111 and 118 may include a flexible material, such as polyethylene terephthalate ("PET"), fiber-reinforced plastic ("FRP"), polyethylene naphthalate ("PEN"), etc.

The first base substrate 111 includes a first gate line GLi−1, a second gate line GLi, a first data line DLj−1, and a second data line DLj. The first and second gate lines GLi−1 and GLi have longitudinal axes which are extended in a first direction D1, and the first and second data lines DLj−1 and DLj have longitudinal axes which are extended in a second direction D2 which crosses the first direction D1, for example, being substantially perpendicular to the first direction D1. The first data line DLj−1 and the second data line DLj cross with and are insulated from the first and second gate lines GLi−1 and GLi.

The first base substrate 111 further includes the thin film transistor TR connected to the first gate line GLi−1 and the second data line DLj, and a pixel electrode PE electrically connected to the thin film transistor TR. The thin film transistor TR includes a gate electrode GE branched from the second gate line GLi, a source electrode SE branched from the second data line DLj, and a drain electrode DE electrically connected to the pixel electrode PE.

Referring to FIG. 3, the first and second gate lines GLi−1 and GLi and the gate electrode GE are disposed directly on the first base substrate 111. A gate insulating layer 112 is disposed on the first base substrate 111 to cover and overlap the first and second gate lines GLi−1 and GLi and the gate electrode GE.

Although not shown in figures, a semiconductor layer is disposed on the gate insulating layer 112. The semiconductor layer is disposed at a position corresponding to the gate electrode and includes an active layer and an ohmic contact layer.

The source electrode SE and the drain electrode DE are disposed on the semiconductor layer and are spaced apart from each other. The source electrode SE and the drain electrode DE are covered by a protective layer 113, and an organic insulating layer 114 may be further disposed on the protective layer 113. The protective layer 113 and the organic insulating layer 114 include a contact hole CH extended therethrough to expose the drain electrode DE of the thin film transistor TR.

The pixel electrode PE is disposed directly on the organic insulating layer 114. The pixel electrode PE is electrically connected to the drain electrode DE through the contact hole CH. The pixel electrode PE may include indium tin oxide ("ITO") or indium zinc oxide ("IZO").

Although not shown in figures, a reflective electrode may be further disposed on the pixel electrode PE. The reflective electrode reflects a light incident thereto when the display apparatus 100 is used as a reflective type display apparatus. Thus, the reflective electrode includes a reflective material, such as metal, having a high reflectance, e.g., aluminum.

The pixel electrode PE in the one pixel is spaced apart from adjacent pixel electrodes in adjacent pixels and is electrically insulated from the adjacent pixel electrodes in the adjacent pixels.

A barrier wall 115 is disposed directly on the organic insulating layer 114 to separate the pixels from each other. The barrier wall 115 defines a storage area RA in each pixel. The barrier wall 115 may be disposed between the pixel electrode PE of the one pixel and the adjacent pixel electrodes in the adjacent pixels, and may be partially overlapped with the pixel electrode PE in a plan view.

In addition, longitudinal axes of the barrier wall 115 may be disposed substantially parallel to the longitudinal axes of the first and second gate lines GLi−1 and GLi and the first and second data lines DLj−1 and DLj, respectively. The barrier wall 115 may be a single, unitary, indivisible member. The display apparatus 100 may include a plurality of barrier walls 115.

A barrier layer 116 is disposed on the pixel electrode PE and the barrier wall 115, and the barrier layer 116 includes a hydrophilic insulating material. That is, the barrier layer 116 may be formed along an outer surface of the barrier wall 115. The barrier layer 116 contacts the pixel electrode PE and the barrier wall 115. In one exemplary embodiment, as an example, the barrier layer 116 may include silicon oxide (SiOx) or silicon nitride (SiNx), but materials are not limited thereto or thereby.

A water-repellent layer 117 is disposed on the barrier layer 116 in the storage area RA. The water-repellent layer 117 is not disposed on the barrier layer 116 that covers the barrier wall 115. The water-repellent layer 117 includes a material having a hydrophobic property or a surface modified to have the hydrophobic property. The water-repellent layer 117 has the hydrophobic property when no electricity is applied to the water-repellent layer 117. On the contrary, when the electricity is applied to the water-repellent layer 117, the water-repellent layer 117 has the hydrophilic property.

In the exemplary embodiment, the water-repellent layer 117 may include any of a number of water-repellant materials, for example, amorphous Teflon® AF1600 by DuPont™, Cytop® fluoropolymer by Asahi Glass Co., Ltd., or Hyflon® AD by Solvay Solexis, but the materials are not limited thereto or thereby.

Common electrode CE is disposed on the second base substrate 118. The common electrode CE faces the pixel electrode PE and receives the common voltage.

First and second fluids FL1 and FL2 are disposed between the first and second base substrates 111 and 118. The first fluid FL1 may be oil having the hydrophobic property. In addition, the first fluid FL1 may include dyes or materials to provide red, green and blue colors. The second fluid FL2 may include a transparent material having conductivity or polarity, e.g., water. The first and second fluids FL1 and FL2 have different specific gravities from each other, and thus the first and second fluids FL1 and FL2 are not mixed with each other and remain separated from each other with reference to a boundary therebetween.

In another exemplary embodiment, as an example, the first fluid FL1 may include a black dye or a light absorbing material to absorb the light incident thereto. In this case, the display apparatus 100 further includes a color filter layer disposed between the second base substrate 118 and the common electrode CE to display the red, green and blue colors.

Although not shown in figures, a column spacer may be further disposed on the common electrode CE of the second base substrate 118. The column spacer is disposed at a position corresponding to the barrier wall 115 to maintain a distance between the first and second substrates 111 and 118. As another exemplary embodiment, in the case that the column spacer is not provided, the barrier wall 115 makes contact with the common electrode CE of the second base substrate 118, effectively functioning as a spacer, and thereby maintaining the distance between the first and second substrates 111 and 118.

In one exemplary embodiment, as an example, when the second fluid FL2 has a positive (+) polarity, the common electrode CE is applied with the common voltage having a negative (−) polarity and the pixel electrode PE is applied with the data voltage having the positive (+) polarity. In this case, the second fluid FL2 moves toward the common electrode CE and the pixel electrode PE is covered by the first fluid FL1. In the case that the first fluid FL1 is colored oil, the first fluid FL1 converts the light provided to the display panel 110 into the light having a corresponding color.

Figure 4:
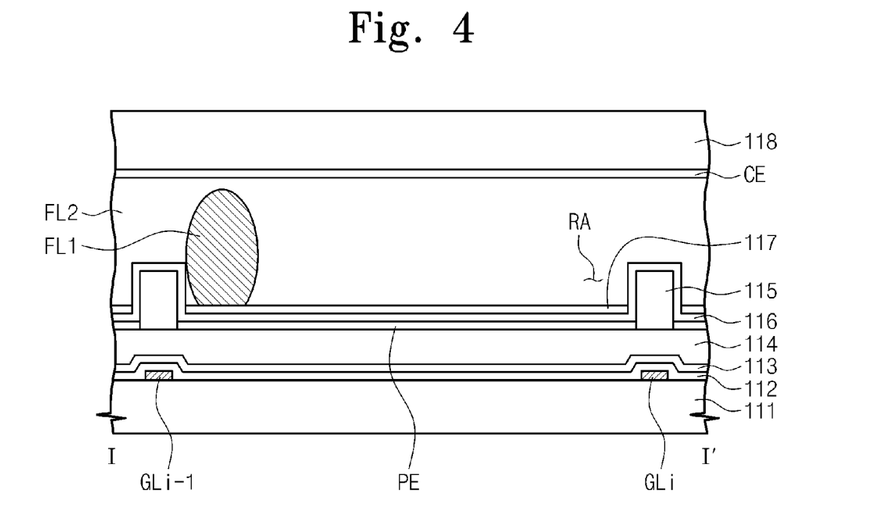
FIG. 4 is a cross-sectional view showing an exemplary embodiment of movement of first and second fluids shown in FIG. 3.

FIG. 4 is a cross-sectional view showing an exemplary embodiment of movement of first and second fluids shown in FIG. 3.

Referring to FIG. 4, when the second fluid FL2 has the positive (+) polarity, the common electrode CE is applied with the common voltage having the positive (+) polarity and the pixel electrode PE is applied with the data voltage having the negative (−) polarity. In this case, the second fluid FL2 moves toward the pixel electrode PE having a different polarity from the polarity of the second fluid FL2. The first fluid FL1 is displaced by the second fluid FL2 which has moved and/or the first fluid FL1 moves to a side of the storage area RA. Accordingly, the light provided to the display panel 110 passes through the second fluid FL2.

The first fluid FL1 concentrated at the side of the storage area RA may have a height greater than that of the barrier wall 115, the heights taken in the cross-sectional view or perpendicular to the first or second base substrates 111 and 118. However, the surface of the barrier wall 115 is covered by the barrier layer 116. As described above, since the barrier layer 116 includes the hydrophilic insulating material, the barrier layer 116 disposed on the surface of the barrier wall 115 may reduce or effectively prevent the first fluid FL1 from moving to the adjacent pixels.

FIGS. 5A to 5E are cross-sectional views showing an exemplary embodiment of a method of manufacturing a display panel shown in FIG. 3. FIGS. 5A to 5E show the process of forming layers disposed on the first base substrate 111 of the display panel 110. Particularly, since the process performed before forming the pixel electrode PE may be substantially the same as that of a conventional display panel, detailed description of the process before forming the pixel electrode PE will be omitted.

Figure 5A:
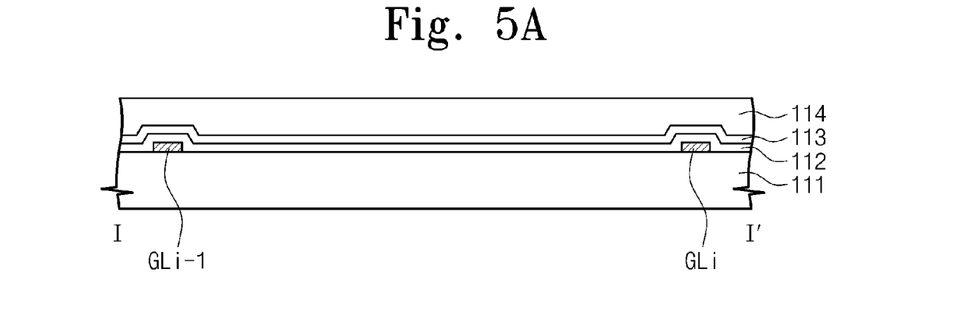
FIGS. 5A to 5E are cross-sectional views showing an exemplary embodiment of a method of manufacturing a display panel shown in FIG. 3.

Referring to FIG. 5A, the first gate line GLi−1, the second gate line GLi and the gate electrode GE are formed on the first base substrate 111. In addition, the gate insulating layer 112 is formed on the first base substrate 111 to cover the first gate line GLi−1, the second gate line GLi and the gate electrode GE. Although not shown in FIG. 5A, the first data line DLj−1, the second data line DLj, the source electrode SE and the drain electrode DE are formed on the gate insulating layer 112.

In addition, the protective layer 113 and the organic insulating layer 114 are sequentially formed on the gate insulating layer 112. The protective layer 113 may include silicon nitride (SiNx) or silicon oxide (SiOx), and the organic insulating layer 114 may include an acryl-containing resin, but the materials are not limited thereto or thereby.

Figure 5B:
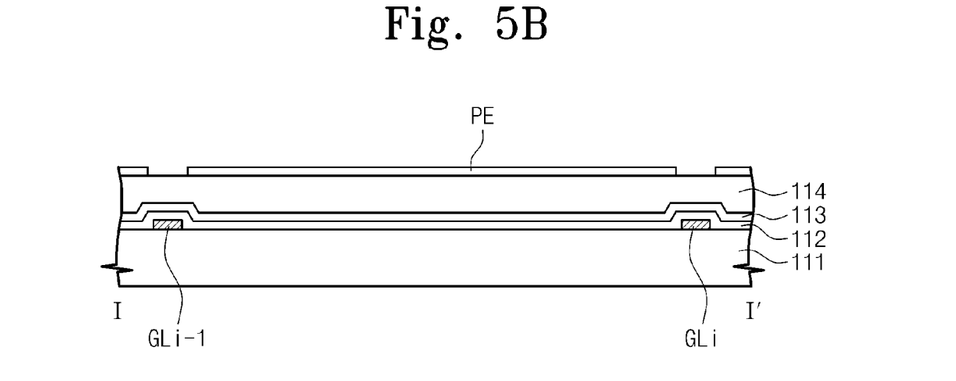

A transparent conductive material is formed on the organic insulating layer 114 and the transparent conductive material is patterned into discrete pixel units which may include a single, unitary, indivisible pixel electrode, thereby forming the pixel electrode PE as shown in FIG. 5B. Thus, the pixel electrode PE in the each pixel may be electrically insulated from the pixel electrodes in the adjacent pixels. Alternatively, more than one pixel electrode PE may be in the one pixel, but the invention is not limited thereto or thereby.

Figure 5C:
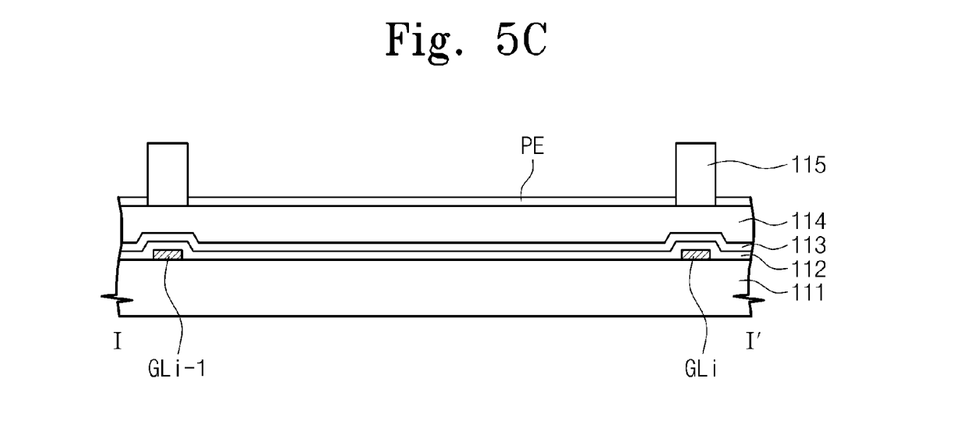

Referring to FIG. 5C, the barrier wall 115 is formed on the organic insulating layer 114 and between pixel electrodes PE, to separate the pixel electrodes PE, and accordingly, adjacent pixels from each other. The barrier wall 115 defines the storage area RA in each pixel. The barrier wall 115 is disposed between the pixel electrode PE of the each pixel and the pixel electrodes in the adjacent pixels. Although not shown in FIG. 5C, when viewed in a plan view, the barrier wall 115 is disposed to be partially overlapped with the pixel electrode PE.

Figure 5D:
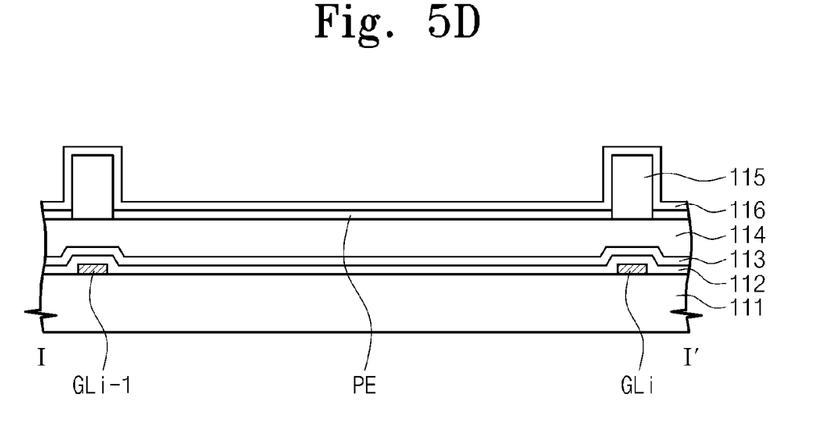

Referring to FIG. 5D, the barrier layer 116 including the hydrophilic insulating material is formed on the pixel electrode PE and the barrier wall 115. The barrier layer 116 may be formed along the outer surface of the barrier wall 115. In the exemplary embodiment, the barrier layer 116 may include silicon oxide (SiOx) or silicon nitride (SiNx). In addition, the barrier layer 116 may have a thickness of about 0.1 nanometer (nm) to about 1 micrometer (μm).

Figure 5E:
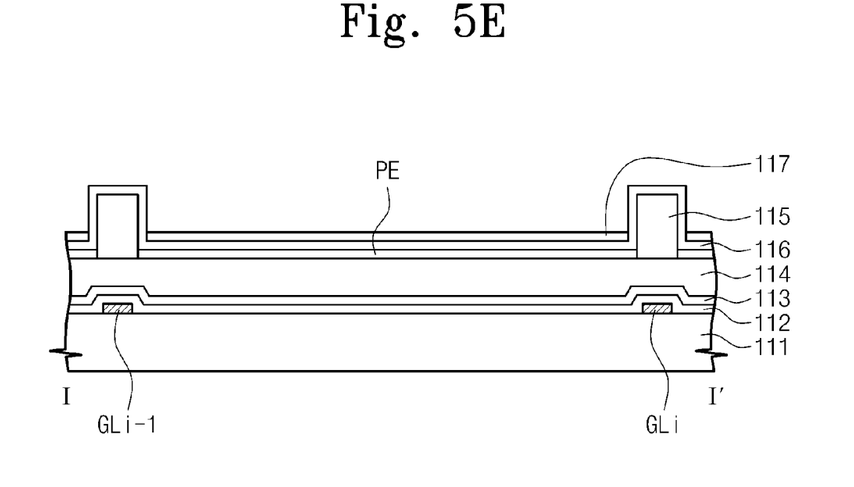

As shown in FIG. 5E, a material having the hydrophobic property is coated on the barrier layer 116. When the hydrophobic material is patterned, the water-repellent layer 117 is formed on the barrier layer 116 in the storage area RA. That is, the hydrophobic material disposed on the barrier layer 116 corresponding to the barrier wall 115 is removed when the hydrophobic material is patterned. The water-repellent layer 117 may have the surface modified to have the hydrophobic property. However, since the surface of the barrier wall 115 is covered by the barrier layer 116, the surface of the barrier wall 115 may have the hydrophilic property.

As described above, the barrier wall 115 directly makes contact with the organic insulating layer 114 or the pixel electrode PE. In other words, the barrier wall 115 may have an improved adhesive force directly contacting the organic insulating layer 114 and/or the pixel electrode PE than when another layer is disposed between the barrier wall 115 and the organic insulating layer 114 and/or between the barrier wall 115 and the pixel electrode PE. In addition, since the barrier wall 115 is formed before forming the barrier layer 116, the surface of the barrier wall 115 may have the hydrophilic property due to the barrier layer 116. Thus, no additional process is required to allow the surface of the barrier wall 115 to have the hydrophilic property. As a result, the manufacturing process of the display panel 110 may be simplified.

FIGS. 6A to 6E are cross-sectional views showing another exemplary embodiment of method of manufacturing a display panel according to the invention. FIGS. 6A to 6E show the process of forming layers disposed on the first base substrate 111 of the display panel 110. In FIGS. 6A to 6E, the same reference numerals denote the same elements in FIGS. 5A to 5E, and thus detailed descriptions of the same elements will be omitted.

Figure 6A:
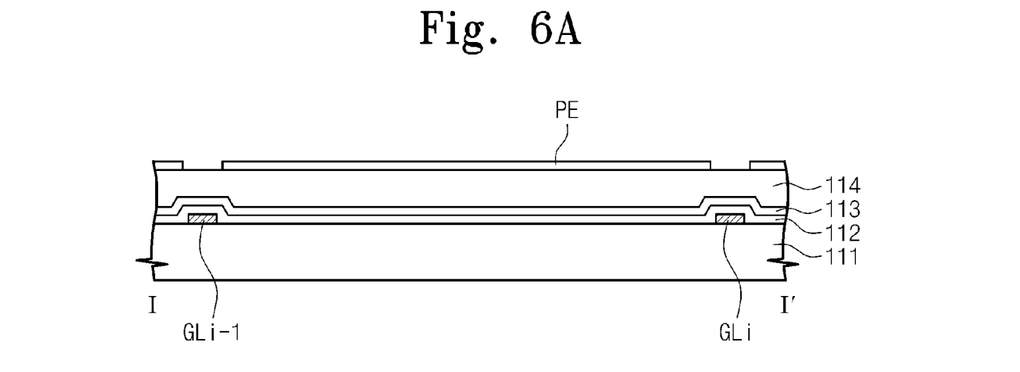
FIGS. 6A to 6E are cross-sectional views showing another exemplary embodiment of method of manufacturing a display panel according to the invention.

As shown in FIG. 6A, the processes performed before forming the pixel electrode PE on the organic insulating layer 114 are the same as those shown in FIGS. 5A and 5B, and thus detailed descriptions of the processes performed before forming the pixel electrode PE on the organic insulating layer 114 are omitted.

Figure 6B:
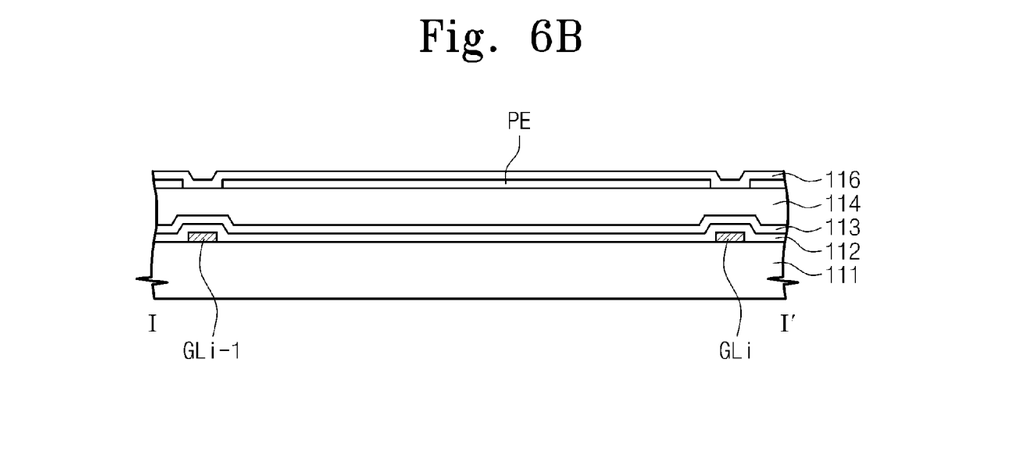

Referring to FIG. 6B, the barrier layer 116 is formed on the organic insulating layer 114 and the pixel electrode PE. The barrier layer 116 contacts the organic insulating layer 114 and the pixel electrode PE. The barrier layer 116 includes the hydrophilic insulating material. In one exemplary embodiment, as an example, the barrier layer 116 may include silicon oxide (SiOx) or silicon nitride (SiNx).

Figure 6C:
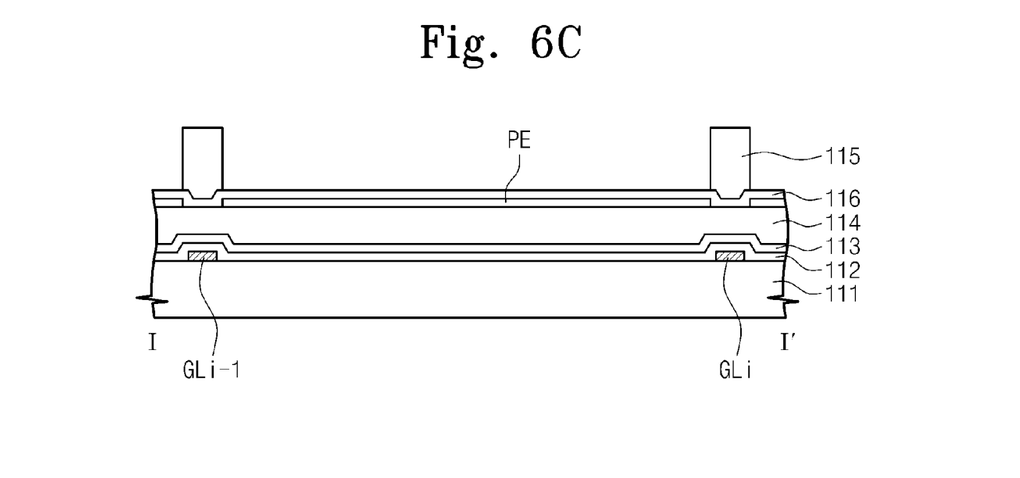

As shown in FIG. 6C, the barrier wall 115 is formed on the barrier layer 116 to separate the pixels from each other, such that a portion of the barrier layer 116 is between the barrier wall 115 and the organic insulating layer 114. The barrier wall 115 defines the storage area RA in each pixel. The barrier wall 115 is disposed between the pixel electrode PE of the each pixel and the pixel electrodes in the adjacent pixels. Although not shown in FIG. 6C, when viewed in a plan view, the barrier wall 115 may be disposed to be partially overlapped with the pixel electrode PE.

Figure 6D:
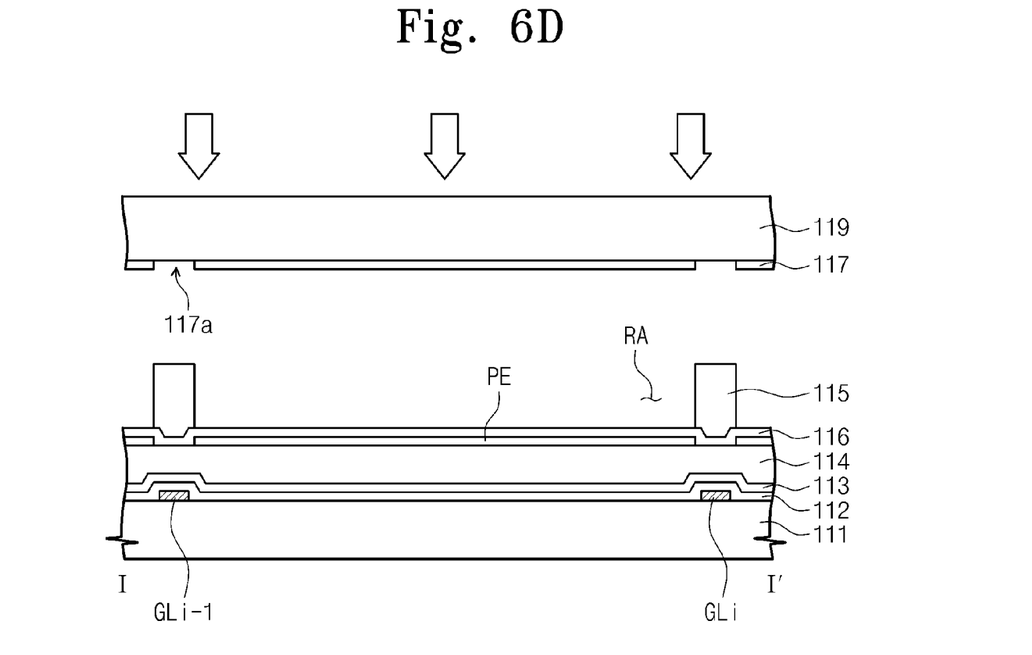

Referring to FIG. 6D, a transfer film 119 is disposed above the barrier wall 115. The water-repellent layer 117 is coated on a lower surface of the transfer film 119, which faces the barrier layer 116. The water-repellent layer 117 is provided with an opening 117a formed therethrough to expose a portion of the lower surface of the transfer film 119, which corresponds to a location of the barrier wall 115. A laser irradiation apparatus (not shown) is disposed on the transfer film 119 to irradiate a laser (indicated by the downward arrows) onto the transfer film 119. The laser irradiation apparatus will be described in detail with reference to FIG. 7.

When the laser is irradiated onto the transfer film 119, the water-repellent layer 117 formed on the lower surface of the transfer film 119 may be transferred onto the barrier layer 116. In one exemplary embodiment, as an example, the water-repellent layer 117 may include any of a number of water-repellant materials, for example, amorphous Teflon® AF1600 by DuPont™, Cytop® fluoropolymer by Asahi Glass Co., Ltd., or Hyflon® AD by Solvay Solexis, but the materials are not limited thereto or thereby. The AF1600, Cytop®, and Hyflon® AD have a glass transition temperature (Tg) of about 160 Celsius and a thermal decomposition temperature (Tdecompsition) of about 350 Celsius. Accordingly, the transfer process of the water-repellent layer 117 may be performed at a temperature lower than temperatures of those of materials otherwise applied to the display panel 110.

Figure 6E:
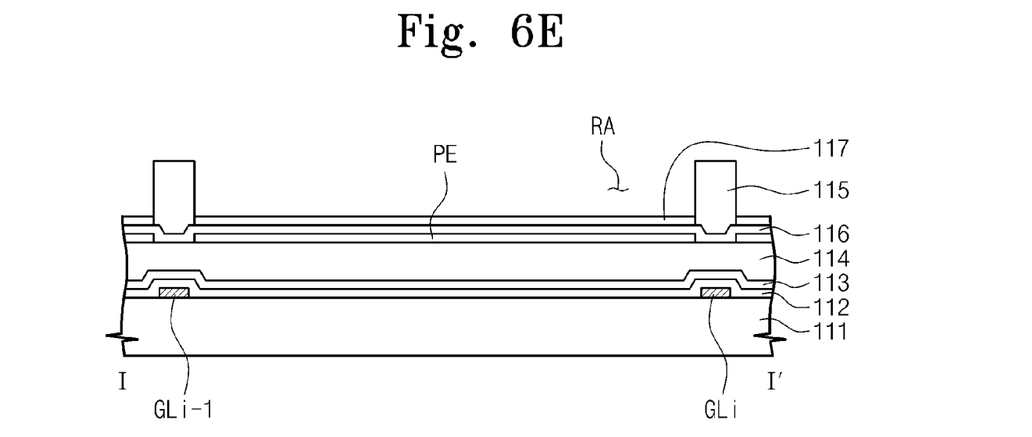

As shown in FIG. 6E, the water-repellent layer 117 may be formed on the barrier layer 116 except the area in which the barrier wall 115 is formed. That is, the water-repellent layer 117 is positioned only in the storage area RA.

According to the above-mentioned manufacturing process, the water-repellent layer 117 is formed on the barrier layer 116 after the barrier wall 115 is formed. Therefore, changing of the surface characteristics of the water-repellent layer 117 may be reduced or effectively prevented during a process of patterning the barrier wall 115, and a material used to form the barrier wall 115 may be reduced or effectively prevented from remaining on the water-repellent layer 117.

Figure 7:
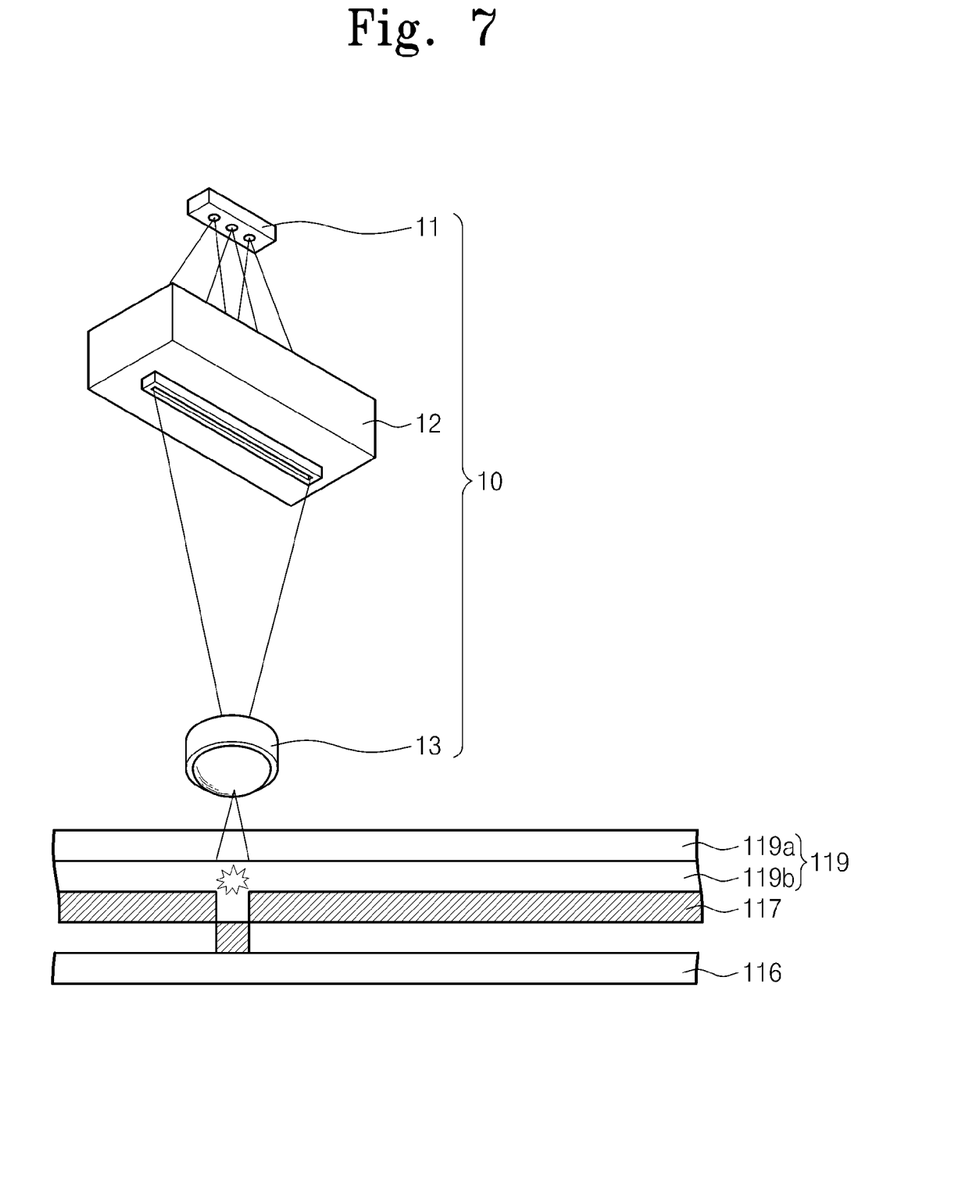
FIG. 7 is a view showing an exemplary embodiment of laser irradiation apparatus according to the invention.

FIG. 7 is a view showing an exemplary embodiment of laser irradiation apparatus according to the invention.

Referring to FIG. 7, a transfer film 119 is laminated on the barrier layer 116 of the first base substrate 111. The transfer film 119 includes a base layer 119a, and a light-heat conversion layer 119b disposed on the base layer 119a. An initial water-repellent layer 117 is disposed on the light-heat conversion layer 119b. In the exemplary embodiment, the base layer 119a may include at least one polymer material selected from the group consisting of polyester, polyacryl, polyepoxy, polyethylene and polystyrene, or glass.

The light-heat conversion layer 119b absorbs the light in the infrared and visible light ranges and partially converts the light into heat. To this end, the light-heat conversion layer 119b includes a light absorbing material. In addition, the light-heat conversion layer 119b may be a metal layer including one of aluminum (Al), silver (Ag), an oxide a sulfide and a combination thereof, or an organic layer including a polymer of carbon black, graphite or infrared ray dye. In this case, the metal layer may be formed by a vacuum deposition method, an electron beam deposition method or a sputtering method, and the organic layer may be formed by a gravure coating method, an extrusion coating method, a spin coating method or a knife coating method.

A laser irradiation apparatus 10 is provided on the transfer film 119. The laser irradiation apparatus 10 includes a light source device 11, a light valve 12 and an auto-focusing lens 13. The light source device 11 includes a near-infrared ray diode. In one exemplary embodiment, as an example, the light source device 11 outputs a laser beam having a wavelength of about 830 nm.

The laser beam output from the light source device 11 is provided to the auto-focusing lens 13 through the light valve 12. The light valve 12 blocks the laser beam that travels to unnecessary areas.

The laser beam passing through the light valve 12 is refracted by the auto-focusing lens 13 and irradiated onto a portion of the base layer 119a.

The laser beam irradiated onto the portion of the base layer 119a is absorbed by the light-heat conversion layer 119b, and then converted into heat energy. Due to the absorbed heat energy, the light-heat conversion layer 119b pushes a portion of the initial water-repellent layer 117 onto the barrier layer 116. Then, the initial water-repellent layer 117 is broken, and thus the portion of the initial water-repellent layer 117 is transferred to the barrier layer 116.

FIGS. 8A to 8D are cross-sectional views showing still another exemplary embodiment of method of manufacturing a display panel according to the invention. FIGS. 8A to 8D show the process of forming layers disposed on the first base substrate 111 of the display panel 110. In FIGS. 8A to 8D, the same reference numerals denote the same elements in FIGS. 6A to 6E, and thus detailed descriptions of the same elements will be omitted.

Figure 8A:
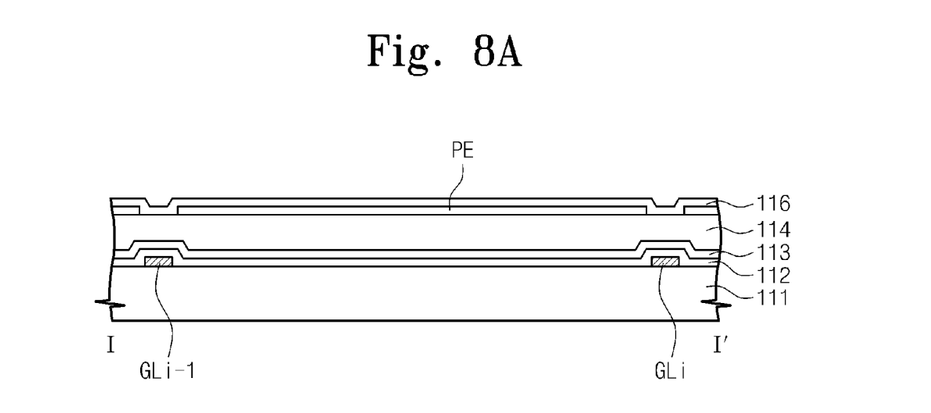
FIGS. 8A to 8D are cross-sectional views showing still another exemplary embodiment of method of manufacturing a display panel according to the invention.

As shown in FIG. 8A, the processes performed before forming the pixel electrode PE on the organic insulating layer 114 are the same as those shown in FIGS. 6A and 6B, and thus detailed descriptions of the processes performed before forming the pixel electrode PE on the organic insulating layer 114 are omitted.

Figure 8B:
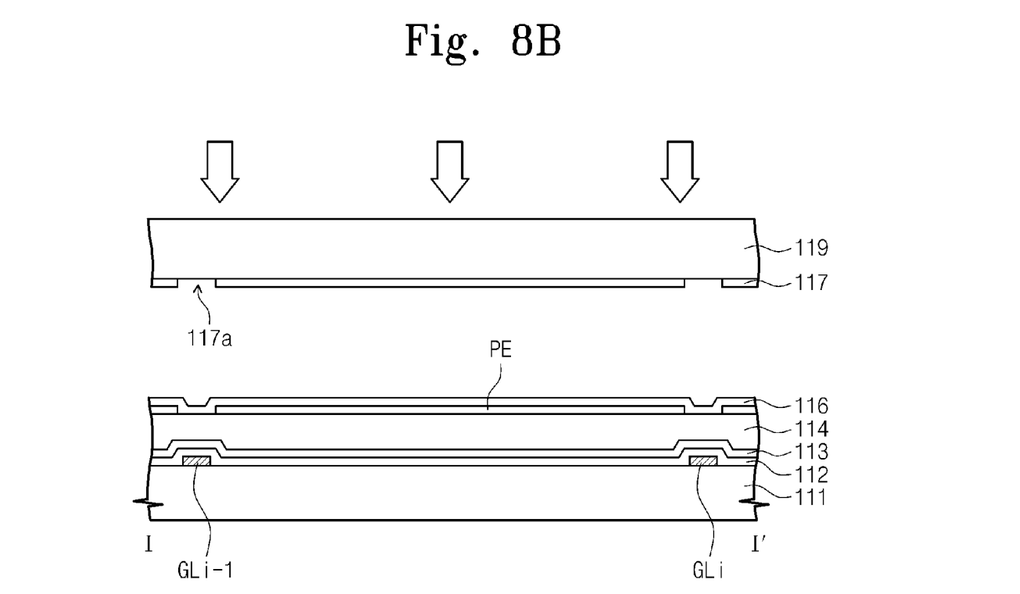

Referring to FIG. 8B, the transfer film 119 is disposed above the barrier layer 116. The water-repellent layer 117 is coated on the lower surface of the transfer film 119, which faces the barrier layer 116. The water-repellent layer 117 is provided with an opening 117a formed therethrough to expose the lower surface of the transfer film 119. The laser irradiation apparatus 10 (FIG. 7) is disposed on the transfer film 119 to irradiate the laser onto the transfer film 119.

When the laser is irradiated (indicated by the downward arrows) onto the transfer film 119 by the laser irradiation apparatus 10, the water-repellent layer 117 formed on the lower surface of the transfer film 119 may be transferred to the barrier layer 116. The water-repellent layer 117 includes the material having the hydrophobic property or a layer of which a surface is modified to have the hydrophobic property.

Figure 8C:
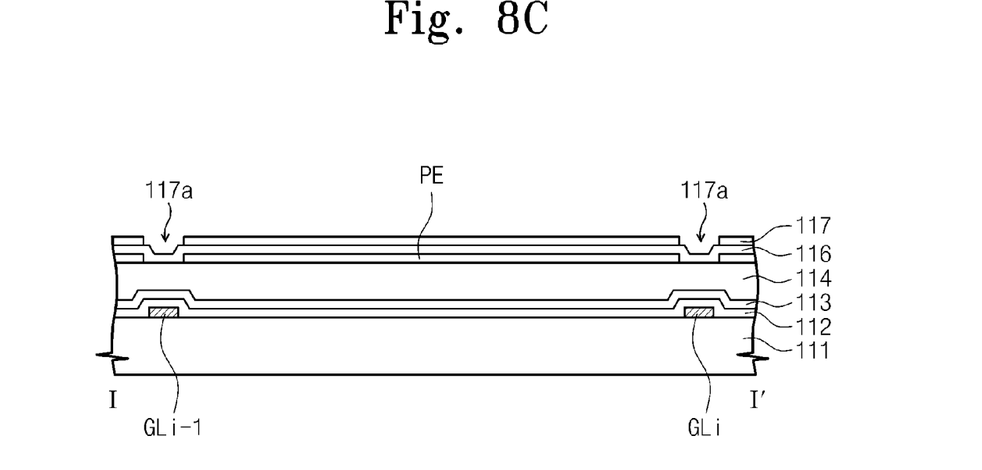

As shown in FIG. 8C, the water-repellent layer 117 may be formed directly on the barrier layer 116. In addition, the water-repellent layer 117 formed on the barrier layer 116 maintains the opening 117a formed therethrough to expose the barrier layer 116.

Figure 8D:
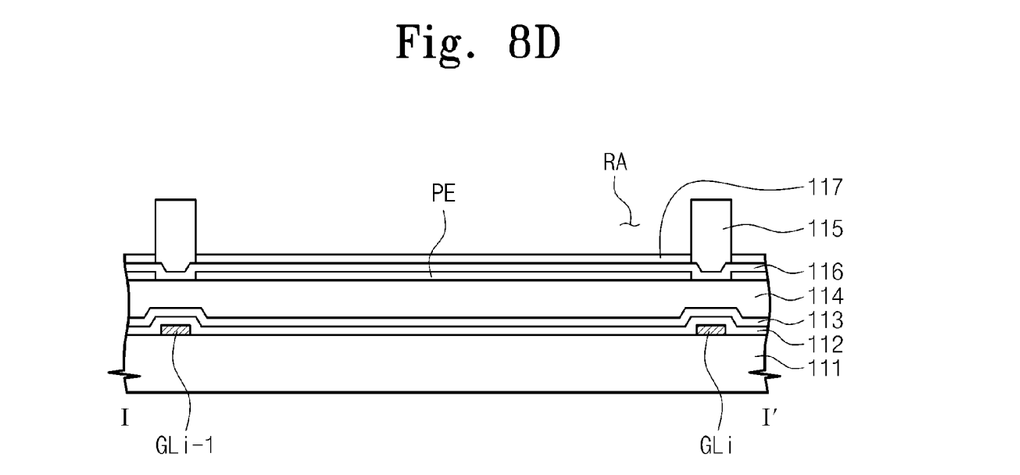

Referring to FIG. 8D, the barrier wall 115 is formed on the barrier layer 116 exposed through the opening 117a of the water-repellent layer 117. The barrier wall 115 defines the storage area RA in each pixel.

According to the above-mentioned manufacturing process, since the water-repellent layer 117 is transferred without solvent, deterioration of the uniformity of the surface of the water-repellent layer 117 due to the evaporation of the solvent may be reduced or effectively prevented.

In addition, according to the above-mentioned transfer process, the water-repellent layer 117 may be transferred to a desired position before the barrier wall 115 is formed.

Although the exemplary embodiments of the invention have been described, it is understood that the invention should not be limited to these exemplary embodiments but various changes and modifications can be made by one ordinary skilled in the art within the spirit and scope of the invention as hereinafter claimed.

What is claimed is:
1. An apparatus comprising:
a first substrate;
a first electrode disposed on the first substrate;
a plurality of walls on the first substrate;
a barrier layer disposed on a surface of the first electrode;
a hydrophobic layer disposed on the barrier layer;
a first fluid disposed on the hydrophobic layer; and
a second fluid disposed on the first fluid, wherein the first fluid and the second fluid have different specific gravities relative to each other such that the first fluid and the second fluid do not mix.

2. The apparatus of claim 1, wherein the hydrophobic layer comprises (i) a hydrophobic material or (ii) a hydrophobic surface.

3. The apparatus of claim 1, wherein:
the first fluid comprises a hydrophobic material and has a red, green, or blue color; and
the second fluid comprises a transparent material, and the transparent material comprises a hydrophilic material.

4. The apparatus of claim 3, further comprising a second electrode disposed on the second substrate, wherein the second electrode faces the first electrode.

5. The apparatus of claim 1, wherein the plurality of walls is disposed on the first electrode.

6. The apparatus of claim 5, wherein the barrier layer overlaps the plurality of walls.

7. The apparatus of claim 1, wherein the plurality of walls is disposed on an insulating layer, and wherein the insulating layer is disposed under the first electrode.

8. The apparatus of claim 7, wherein the barrier layer overlaps the plurality of walls.

9. The apparatus of claim 1, wherein the barrier layer comprises a hydrophilic insulating material.

10. The apparatus of claim 9, wherein the barrier layer comprises (i) silicon nitride or (ii) silicon oxide.

11. The apparatus of claim 10, wherein the barrier layer has a thickness in a range of approximately 0.1 nanometers to approximately 1 micrometer.

12. An electrowetting display comprising:
a first substrate;
a second substrate opposite to the first substrate;
a first electrode disposed on the first substrate;
a second electrode opposite to the first electrode;
a barrier layer disposed on a surface of the first electrode;
a hydrophobic layer disposed on the barrier layer; and
a plurality of walls between the first substrate and the second substrate,
wherein the plurality of walls separate pixels, and wherein each pixel comprises
a first fluid on the hydrophobic layer, and
a second fluid on the first fluid,
wherein the first fluid and the second fluid have different specific gravities relative to each other such that the first fluid and the second fluid do not mix,
wherein the second fluid has a polarity, and
the second fluid moves according to a polarity of a first voltage that is applied to the first electrode and a second voltage that is applied to the second electrode.

13. The electrowetting display of claim 12, wherein the hydrophobic layer comprises (i) a hydrophobic material or (ii) a hydrophobic surface.

14. The electrowetting display of claim 12, wherein:
the first fluid comprises a hydrophobic material and has a red, green, or blue color; and
the second fluid comprises a transparent material, and the transparent material comprises a hydrophilic material.

15. The electrowetting display of claim 12, wherein the plurality of walls is disposed on the first electrode.

16. The electrowetting display of claim 15, wherein the barrier layer overlaps the plurality of walls.

17. The electrowetting display of claim 12, wherein the plurality of walls is disposed on an insulating layer, and wherein the insulating layer is disposed under the first electrode.

18. The electrowetting display of claim 17, wherein the barrier layer overlaps the plurality of walls.

19. The electrowetting display of claim 12, wherein the barrier layer comprises a hydrophilic insulating material.

20. The electrowetting display of claim 19, wherein the barrier layer comprises (i) silicon nitride or (ii) silicon oxide.

21. The electrowetting display of claim 20, wherein the barrier layer has a thickness in a range of approximately 0.1 nanometers to approximately 1 micrometer.

* * * * *